(12) United States Patent
Agarwal et al.

(10) Patent No.: US 7,447,410 B2
(45) Date of Patent: Nov. 4, 2008

(54) CHG RING RESONATORS

(75) Inventors: Anuradha M. Agarwal, Weston, MA (US); Juejun Hu, Cambridge, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/487,131

(22) Filed: Jul. 14, 2006

(65) Prior Publication Data
US 2007/0025410 A1 Feb. 1, 2007

Related U.S. Application Data

(60) Provisional application No. 60/699,316, filed on Jul. 14, 2005.

(51) Int. Cl.
*G02B 6/10* (2006.01)
(52) U.S. Cl. ...................................... 385/129
(58) Field of Classification Search ............... None
See application file for complete search history.

(56) References Cited

U.S. PATENT DOCUMENTS

| | | | |
|---|---|---|---|
| 5,077,239 A | 12/1991 | Singh et al. | |
| 5,136,677 A | 8/1992 | Drexhage et al. | |
| 6,208,792 B1 | 3/2001 | Hwang et al. | |
| 6,393,167 B1 | 5/2002 | Davis et al. | |
| 6,574,387 B2 | 6/2003 | Wu | |
| 6,749,905 B1 * | 6/2004 | Breitung et al. | 427/585 |
| 6,788,862 B2 | 9/2004 | Atiken et al. | |
| 6,819,837 B2 | 11/2004 | Li et al. | |
| 6,853,785 B2 | 2/2005 | Dunn et al. | |
| 6,881,603 B2 | 4/2005 | Lai | |
| 6,891,997 B2 | 5/2005 | Sercel et al. | |
| 7,174,078 B2 * | 2/2007 | Libori et al. | 385/125 |
| 2004/0008959 A1 * | 1/2004 | Haase et al. | 385/129 |
| 2004/0126072 A1 | 7/2004 | Hoon et al. | |
| 2004/0150268 A1 * | 8/2004 | Garito et al. | 310/12 |

FOREIGN PATENT DOCUMENTS

| JP | 03021934 | 1/1991 |
|---|---|---|
| SU | 1798757 | 3/1990 |
| WO | WO 03/025626 | 3/2003 |

OTHER PUBLICATIONS

Spalter et al., "highly nonlinear chalcogenide glasses for ultrafast all optical switching in optical TDM communication systems" ThI4-1, pp. 137-139.
Chao et al., "Biochemical sensors based on polymer microrings with sharp asymmetrical resonance" Applied Physics Letters, vol. 83, No. 8, pp. 1527-1529.
Ganjoo et al., "Fabrication of chalcogenide glass waveguide for IR evanescent wave sensors" Proceedings of SPIE vol. 5593, pp. 637-642.

* cited by examiner

*Primary Examiner*—Sung Pak
*Assistant Examiner*—Chad H Smith
(74) *Attorney, Agent, or Firm*—Gauthier & Connors LLP

(57) ABSTRACT

A ring resonator structure includes a semiconductor substrate, a core, and a cladding. Either the core or the cladding comprises chalcogenide glass to improve electromagnetic confinement in the ring resonator structure.

12 Claims, 12 Drawing Sheets

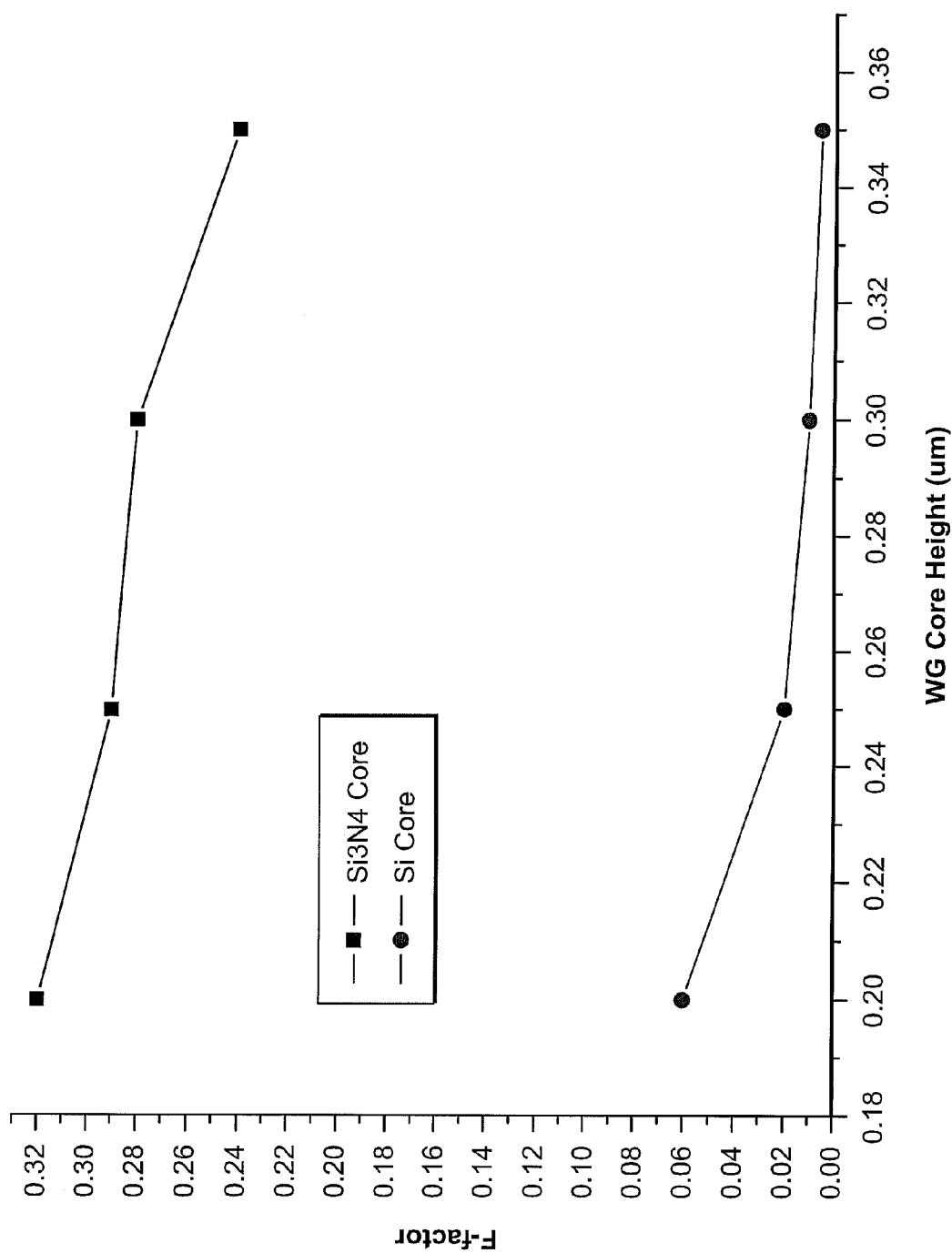

CHG RING RESONATORS

PRIORITY INFORMATION

This application claims priority from provisional application Ser. No. 60/699,316 filed Jul. 14, 2005, which is incorporated herein by reference in its entirety.

BACKGROUND OF THE INVENTION

The invention relates to the field of ring resonators, and in particular to ring resonators having chalcogenide glass to improve confinement.

In recent years, optical switches are finding increasing applications in DWDM optical communication systems. They are also indispensable components for programmable optical circuits. Current optical switches often employ an interferometer configuration (e.g., Mach-Zehnder or Sagnac interferometer), which turns light on and off by either constructive or destructive interference. However, since refractive index change of most materials either due to thermo-optic or electro-optic effect is typically small, interferometer switch schemes often require relatively long device length to achieve switching effect. The development of microring resonator structure provides a unique solution to optical switching. By its light confining nature and hence the high optical power stored in the ring, a small index change can lead to a relatively large resonant wavelength shift and high on-off ratio. In addition, it features a compact, in the order of a few 10 microns, and flexible for all-optical switching. The index change can be introduced by thermo-optic, eletro-optic effects or optical nonlinearity.

SUMMARY OF THE INVENTION

According to one aspect of the invention, there is provided a ring resonator structure. The ring resonator structure includes a semiconductor substrate, a core, and a cladding. Either the core or the cladding comprises chalcogenide glass to improve electromagnetic confinement in the ring resonator structure.

According to another aspect of the invention, there is provided a method of fabricating a ring resonator structure. The method includes providing a semiconductor substrate, forming a core, and forming a cladding. Either the core or the cladding comprises chalcogenide glass to improve electromagnetic confinement in the ring resonator structure.

BRIEF DESCRIPTION OF THE DRAWINGS

FIG. 9A shows a graph demonstrating the advantages of using a core having $Si_3N_4$ for the ring resonator structure shown in FIG. 8.

DETAILED DESCRIPTION OF THE INVENTION

In a ring resonator, the resonant wavelength is readily determined by the material refractive indices and structure geometry. A refractive index change induced either by photoinduced refractive index change (PRC) effect or optical nonlinearity shifts the resonance on or off the working wavelength (e.g. 1.31 µm or 1.55 µm), which defines the optical 'on' and 'off' states and thus optical switching is achieved. Besides optical switching, tunability of the resonant wavelength also provides large optical system design flexibility and a number of other device applications, such as modulators, tunable add-drop filters and ring resonator trimming.

The photoinduced refractive index change (PRC) effect, which refers to the refractive index change of chalcogenide glasses under near bandgap light illumination of appropriate. The term chalcogenide glasses defines a large family of vitreous materials fabricated from metals and/or nonmetals, such as As, Ge, Sb, in conjunction with the heavier elements in the oxygen family, such as the chalcogens S, Se, Te.

Many chalcogenide glasses exhibit large optical nonlinearity and significant PRC effects that are very promising for optical switching, high-speed modulation and ring resonator trimming. Chalcogenide glasses are one of the materials known with largest third-order nonlinear optical effects, which is promising for ultra-high-speed optical switching. PRC effect is another efficient way of tuning chalcogenide material index. An index change in the order of 0.01 is reported in $As_2S_3$ glass films, which suggests large device tunability potential. Depending on the exposure wavelength and power, PRC effect can be either irreversible or reversible by thermal annealing to near glass transition temperature, which offers the possibility for programmable optical circuit components and reversible ring resonator trimming.

The extinction ratio and/or modulation depth of the device is approximately proportional to the square of the ring's quality factor Q. However, at present, the Q of high-index-contrast (HIC) microrings is limited by the scattering loss resulting from sidewall roughness, and also significant sidewall roughness after etching is observed in chalcogenide glass waveguides. In resolving this issue, thermal reflow technique has previously demonstrated a reduction of sidewall roughness of organic polymer waveguides. There are also precedents of using thermal reflow techniques to fabricate chalcogenide microlens arrays. Therefore, one can utilize thermal reflow techniques to reduce sidewall roughness in chalcogenide core waveguides and microring resonators, which can lead to high-Q resonator structures.

In this invention, examples are provided for applications of PRC effect in tunable resonator structures.

Figure 1:
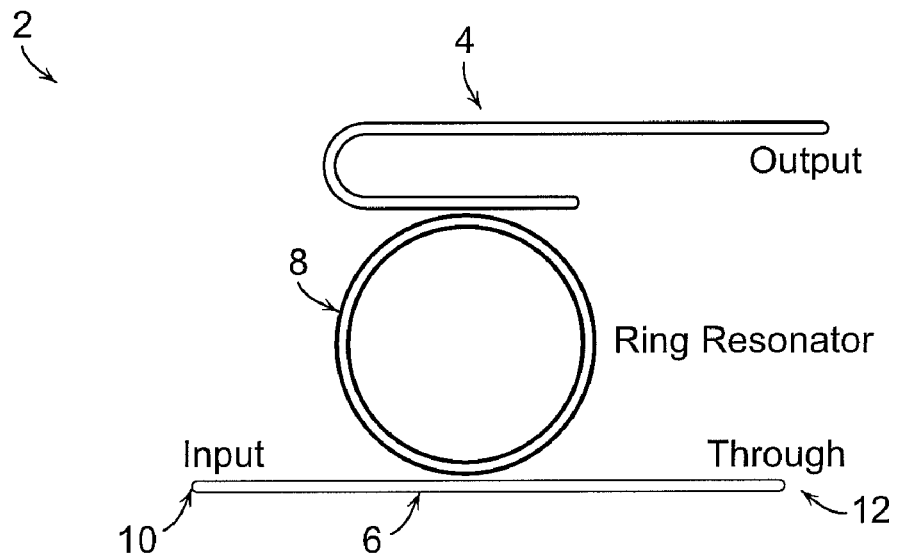
FIG. 1 is a schematic diagram showing an arrangement of a ring resonator switch.

FIG. 1 shows an arrangement of a ring resonator switch 2. The ring resonator switch 2 includes an input waveguide 6 having an input port 10 and throughput port 12, output waveguide 4, and a ring resonator structure 8. The input waveguide 6 uses its input port 10 to receive optical signals having various optical wavelengths. Both the input waveguide 6 and output waveguide 4 are coupled to the ring resonator structure 8. By coupling the ring resonator structure 8 with the input waveguide 6, optical signals having selective wavelengths are permitted to pass the ring resonator structure 8 to the output waveguide 4. Those optical signals whose wavelengths are not permitted to pass are sent to the throughput port 12. The output waveguide 4 and input waveguide 6 are comprised of two parallel ridge waveguides, however, other waveguides can be used.

Figure 2:
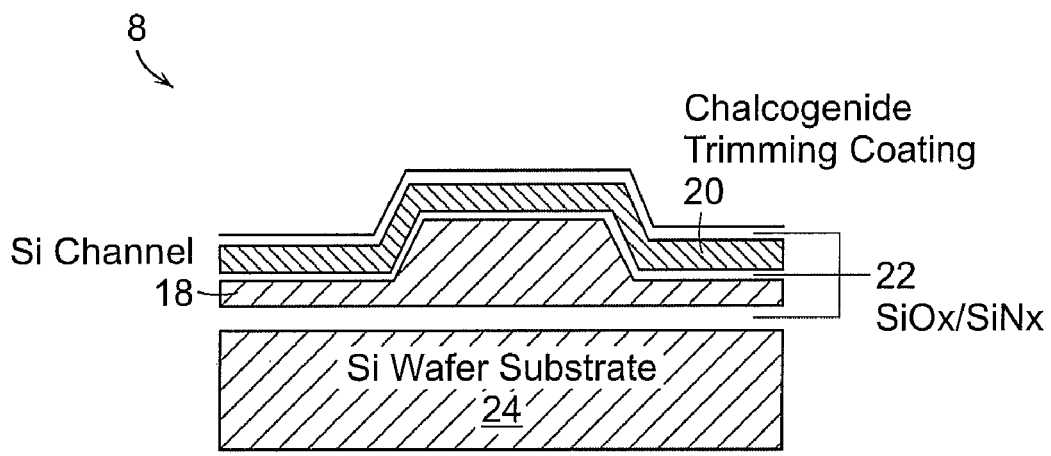
FIG. 2 is a schematic diagram illustrating the cross-section of the ring resonator structure of FIG. 1 having chalcogenide as trimming coating material 20.

Note the ring resonator in this embodiment includes chalcogenide as trimming coating material. FIG. 2 shows a cross-section of the ring resonator structure 8 having chalcogenide as trimming coating material 20. As shown in FIG. 2, the ring resonator structure includes a channel region 18, cladding layers 22, and a trimming coating layer 20.

Given the refractive index of the glass is typically between 2 and 3, the cladding material can be comprised of $SiO_x$, $SiN_x$ or polymers such as PMMA. Note the cladding layers 22 are divided into three regions having the same materials.

For ultra-fast switching purposes, glasses with high optical nonlinearity are suitable candidates for the cladding. For switching devices utilizing PRC effects, the trimming coating layer 20 can be made of chalcogenide glass whose bandgap is slightly larger than the signal wavelength. In both cases, by shining light of appropriate intensity and wavelength, combined with local annealing in PRC-based devices, the index of the trimming coating layer can be shifted, resulting in output and throughput intensity change and hence the switching effect. The trimming coating layer 20 can be formed by thermal evaporation or other film deposition techniques, such as sputtering or CVD.

In this embodiment, the cladding layers 22 can be formed by thermal oxidization of Si wafers to form a thermal oxide layer, such as $SiO_2$. The channel layer 18 can be formed by deposition of poly-Si on one of the cladding layers 22 and using photolithography to define its shape. The internal layer is formed between the channel layer and trimming coating layer using deposition techniques.

Figure 3A:
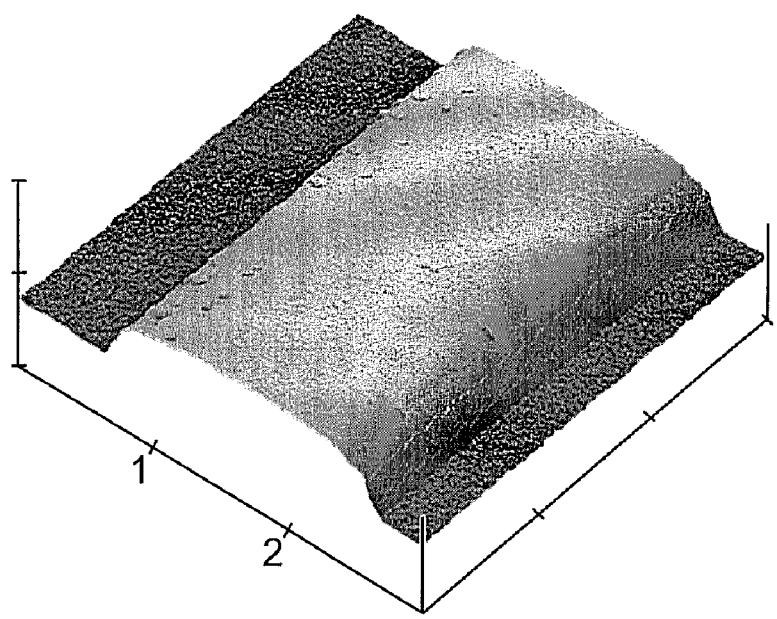
FIG. 3A is a TEM demonstrating a fabricated $Ge_{23}Sb_7S_{70}$ channel waveguide which shows a rough surface resulting from the fabrication process.
Figure 3B:
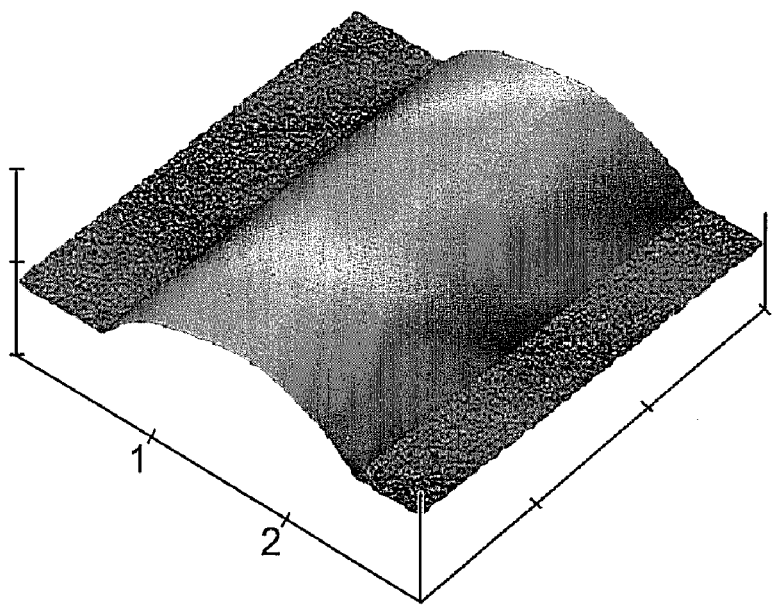
FIG. 3B is a TEM demonstrating a $Ge_{23}Sb_7S_{70}$ channel waveguide reflowed at 450° C. for 5 min showing that the reflow process effectively eliminated surface roughness.

The invention uses a thermal reflow process in which glass or polymer materials or devices are annealed above their glass transition temperature in order to induce morphological modifications due to the materials' surface tension. One can successfully utilized the process to remove surface roughness on chalcogenide waveguides resulting from patterning process. A typical reflow process includes an anneal of the chalcogenide waveguides at a temperature ranging from 250° C.-500° C. for a time of a few minutes to a few hours. FIGS. 3A-3B shows two AFM images that compare the surface morphology of a $Ge_{23}Sb_7S_{70}$ waveguide before, shown in FIG. 3A, and after thermal reflow, as shown in FIG. 3B. Quantitative analysis of the image revealed that the top surface rms roughness had been reduced from 1.9 nm to below 0.5 nm and a significant roughness reduction was achieved. $Ge_{23}Sb_7S_{70}$ channel waveguides with propagation loss as low as 4.5 dB/cm at the wavelength of 1550 nm has been fabricated using this technique.

Figure 4:
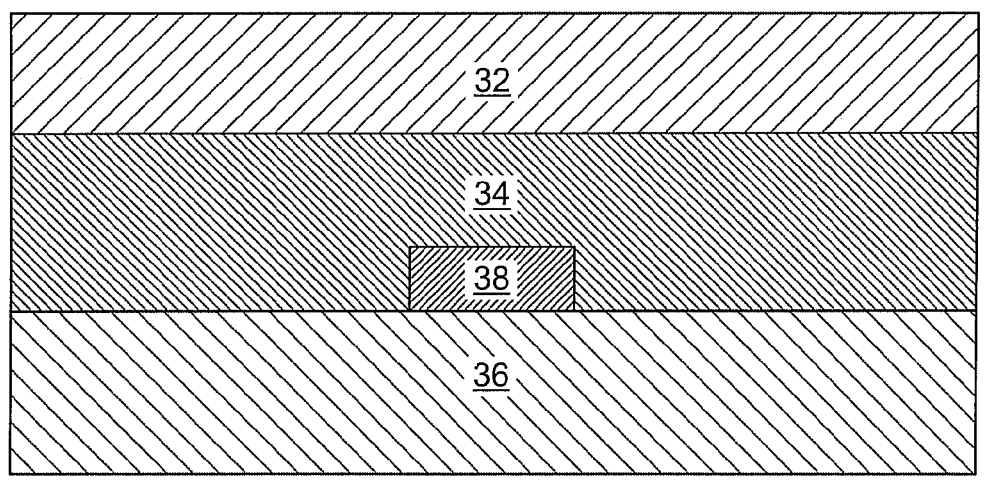
FIG. 4 is a schematic diagram illustrating a cross-section of a ring resonator structure having chalcogenide glass as a cladding.

FIG. 4 shows a cross-section of a ring resonator structure 30 having chalcogenide glass as a cladding. The resonator structure includes a core 38 having Si, an insulating substrate 36, and a cladding layer 34. The core 38 is formed on the insulating substrate 36, which can be comprised of $SiO_2$. The cladding layer 34 totally encompasses the top and side regions of the core 38. Note the cladding layer 34 includes chalcogenide glass, which is formed using thermal evaporation or other film deposition techniques, such as sputtering or CVD. The aspect ratio for this ring resonator structure 30 is fixed at 2, while the core 38 can have varied heights. The cladding layer 34 is sized to be approximately 1 μm. Loss is determined by the sidewall roughness of the core 38. Note the cladding layer 34 provides separation between the core 38 and air 32. The insulating substrate 36, in this embodiment, is comprised of $SiO_2$ but other insulating substrates can be used.

Figure 5A:
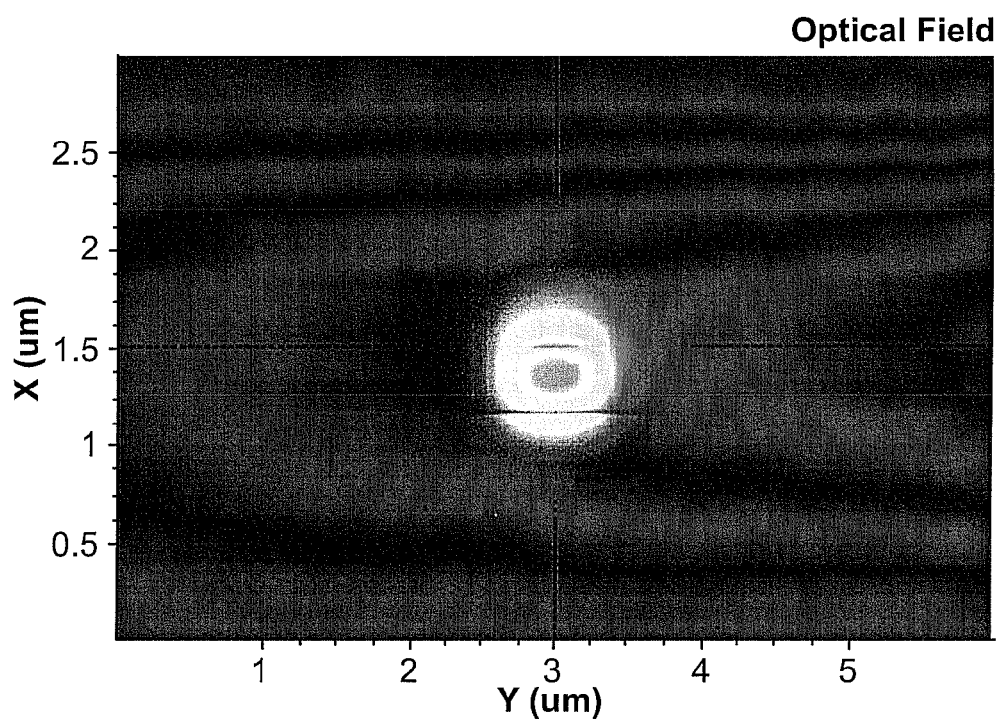
FIG. 5A is a TEM graph of the TE mode ring resonator structure of FIG. 4.
Figure 5B:
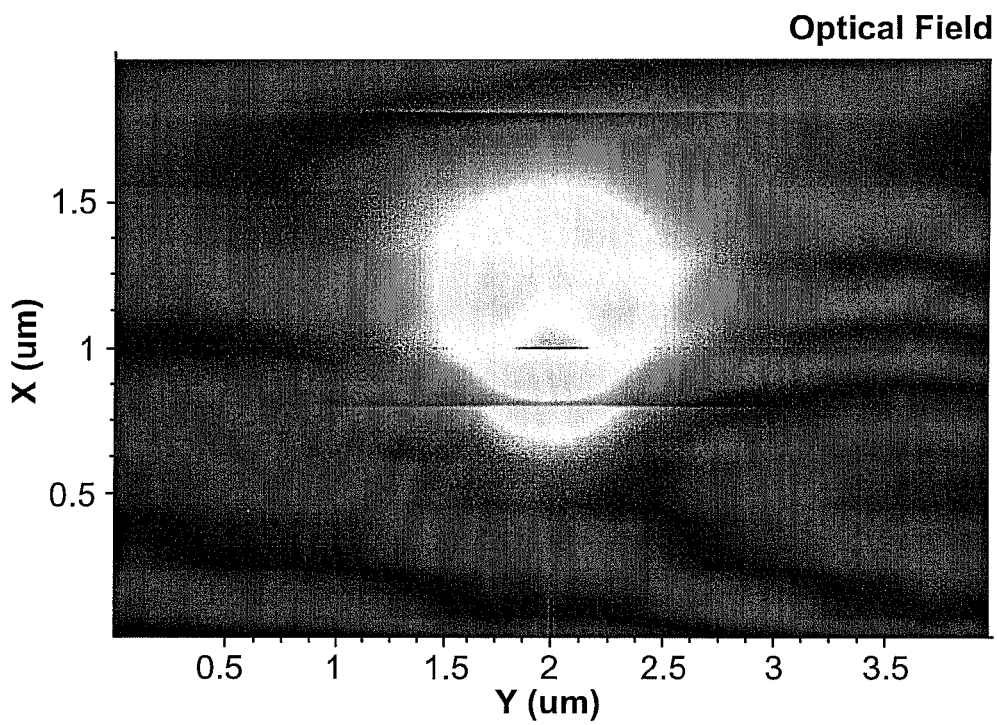
FIG. 5B is a TEM graph of the TM mode for the ring resonator structure of FIG. 3.
Figure 5C:
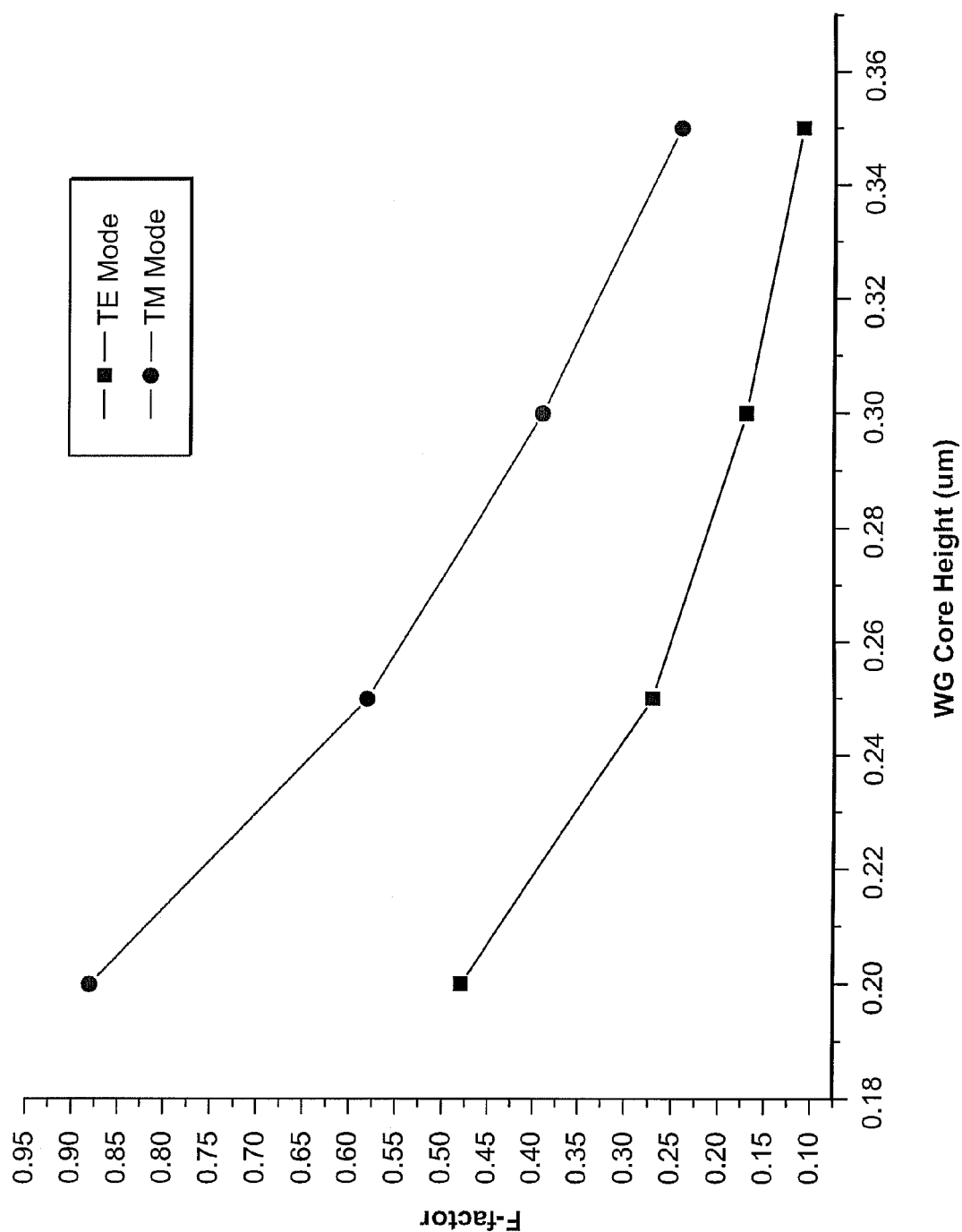
FIG. 5C is a graph showing the relationship between the confinement factor (F-factor) and core height for the ring resonator structure of FIG. 3.

FIG. 5A is a TEM graph of the TE mode and FIG. 4B is a TEM graph of the TM mode for the ring resonator structure 30 of FIG. 3. Both FIGS. 5A and 5B illustrate strong confinement of both the TE modes and TM modes. FIG. 5C shows the relationship between the confinement factor (F-factor) and core height for the ring resonator structure 30. Note FIG. 5C shows that a larger core size leads to better confinement and smaller index effective index change for both the TE and TM modes.

Figure 6:
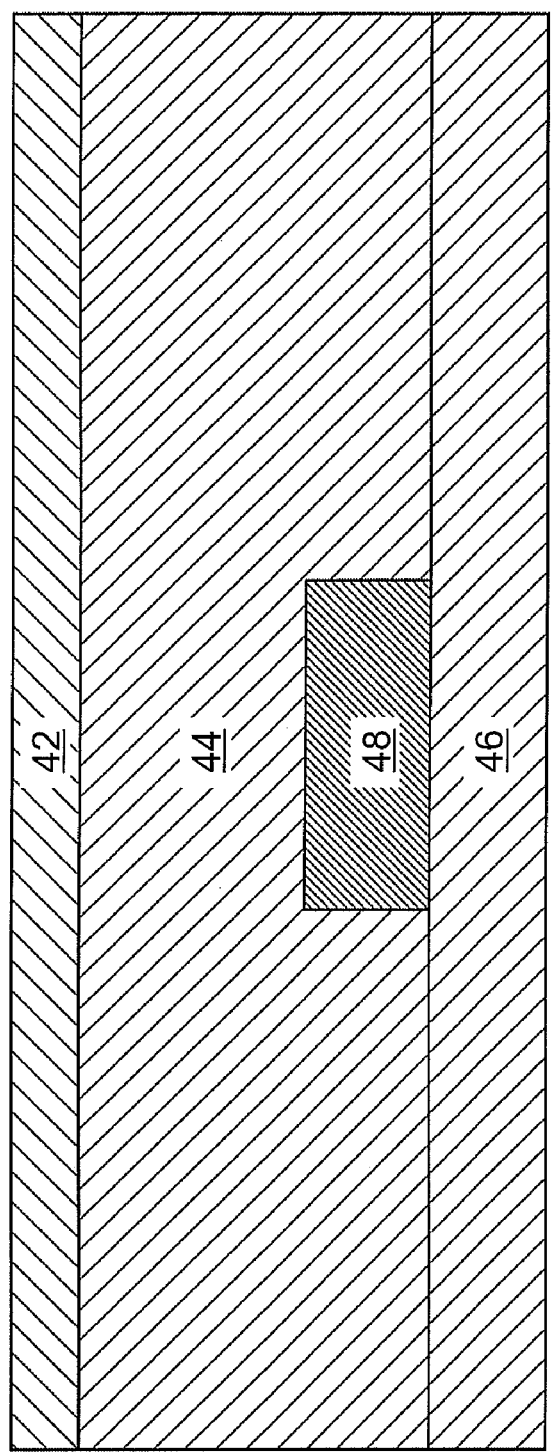
FIG. 6 is a schematic diagram illustrating a cross-section of a ring resonator structure having chalcogenide glass as a core.

FIG. 6 shows a cross-section of a ring resonator structure having chalcogenide glass as a core. The ring resonator structure includes a cladding layer 44 having $SiO_x$, $SiN_x$ or polymers such as PMMA. The core 48 is formed on a Si substrate 46 using thermal evaporation or other film deposition techniques, such as sputtering or CVD. After the deposition of the chalcogenide glass, etching is used to make the shape and dimension of the core 48. Note the cladding layer 44 provides separation between the core 48 and air. The ring resonator structure 40 provides a large confinement factor (F-factor), which is suitable for waveguiding. Also, the ring resonator structure 40 provides low radiative loss, which is excellent for fabricating ultra-low loss waveguide structures. Moreover, the ring resonator structure 40 provides flexibility in the materials used to form the cladding layer 44. Note the cladding layer 44 provides separation between the core 48 and air 42.

Figure 7A:
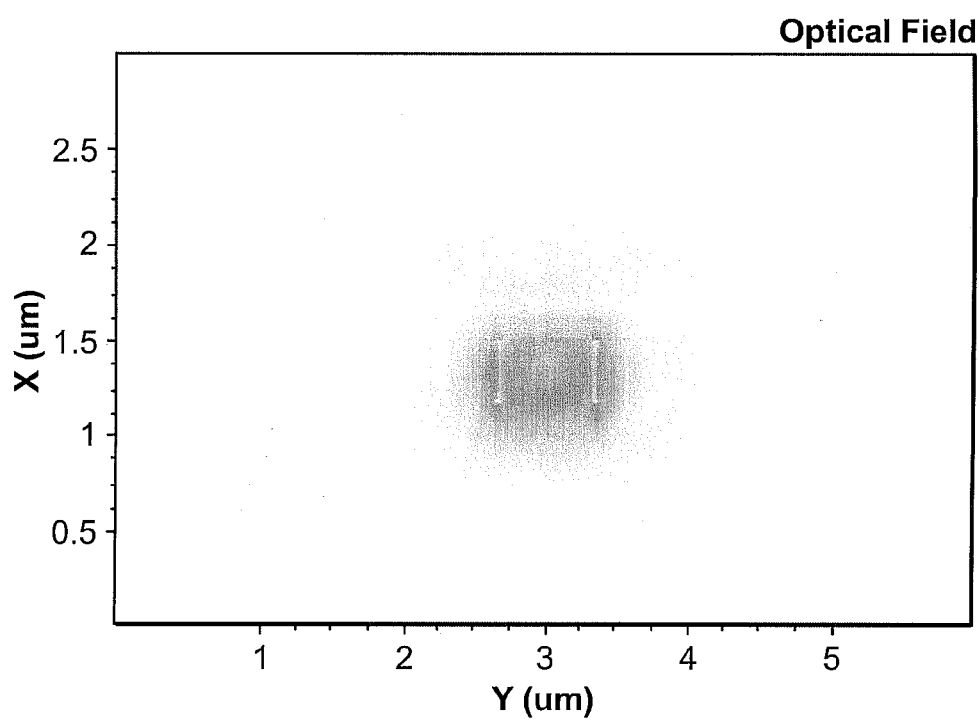
FIG. 7A shows a TEM diagram of the TE and TM confinement in the core of the ring resonator structure of FIG. 5.
Figure 7B:
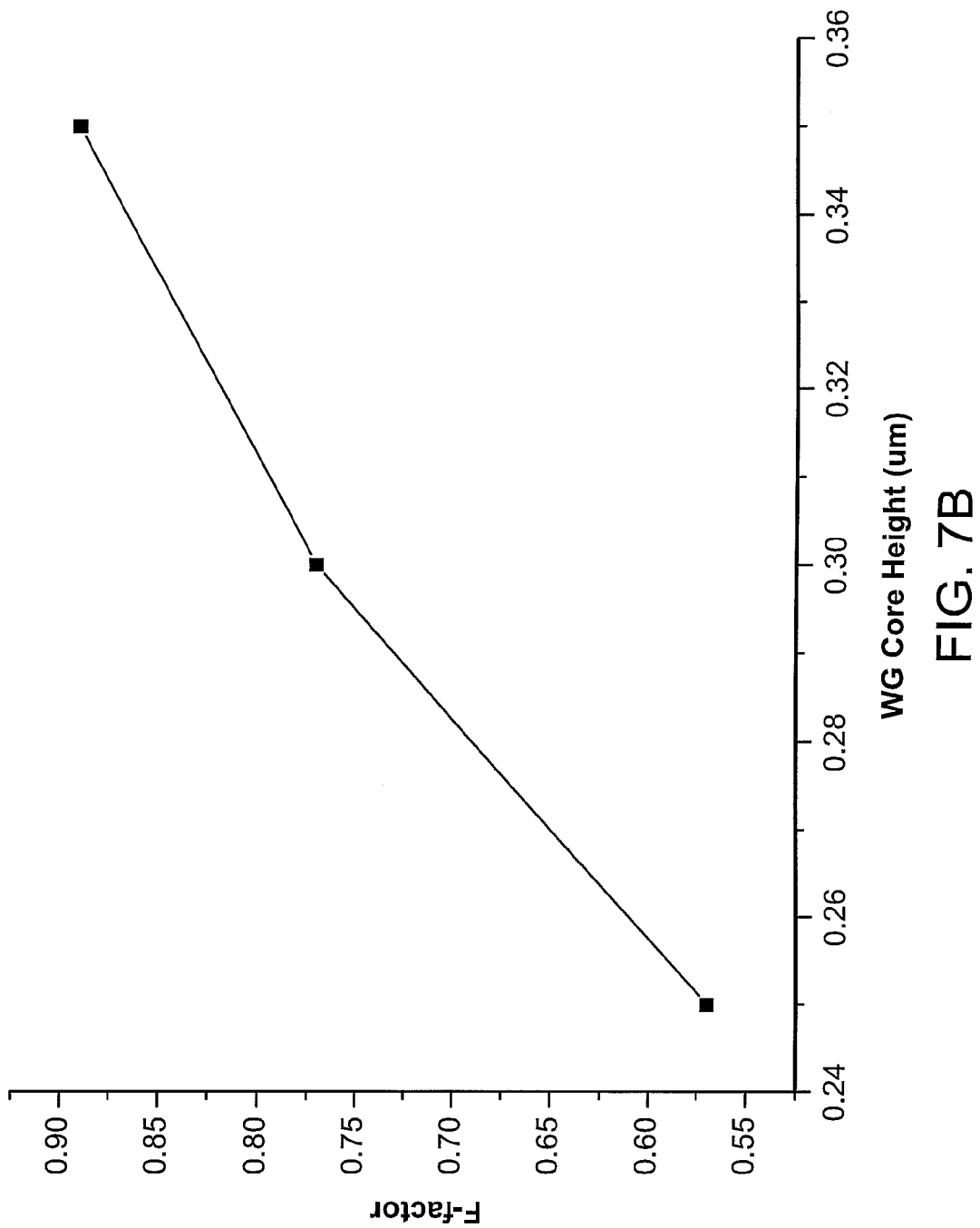
FIG. 7B is a graph demonstrating improvement in the F-factor associated with confinement of the ring resonator structure of FIG. 6.
Figure 7C:
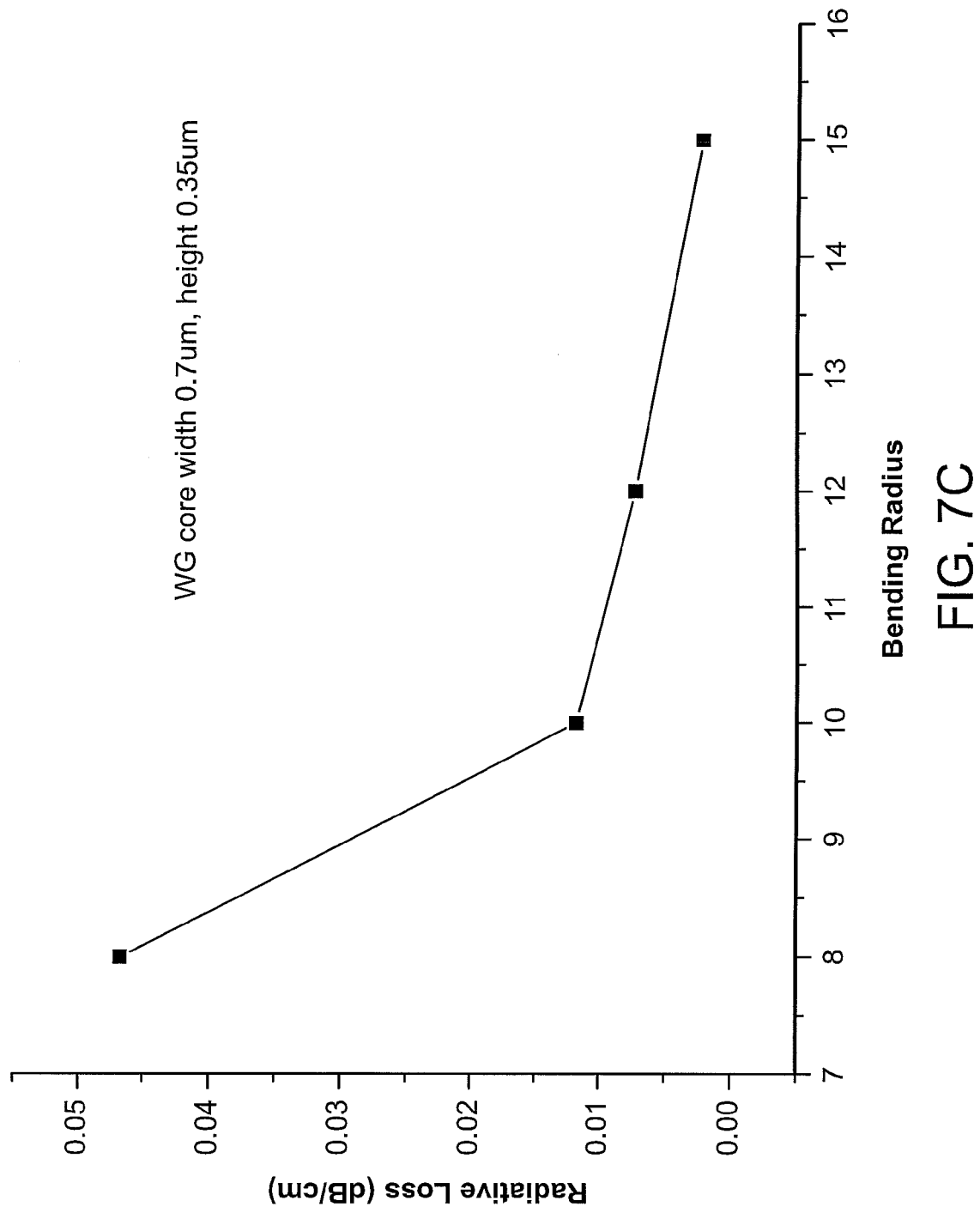
FIG. 7C is a graph showing radiative loss of the ring resonator structure of FIG. 6.

FIG. 7A shows a TEM diagram of the TE and TM confinement in the core 48 of the ring resonator structure 40. FIG. 7B shows a graph demonstrating improvement in the F-factor associated with confinement. Moreover, FIG. 7B demonstrates that the larger the core 48 the better the confinement. FIG. 7C shows the how negligible radiative loss is when the core 48 is made larger. The reason this occurs is the use of the chalcogenide glass and low scattering loss associated with such materials.

Figure 8:
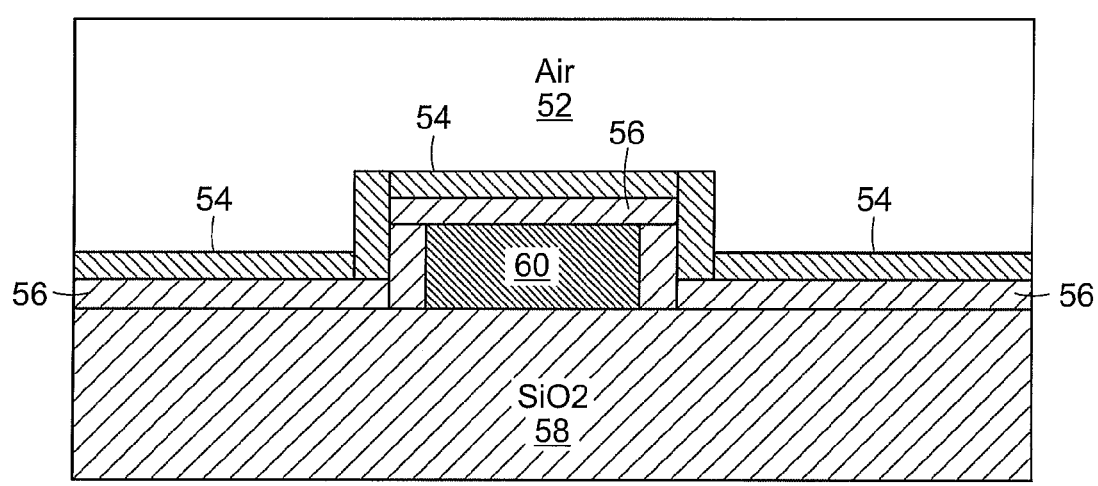
FIG. 8 is a schematic diagram illustrating a ring resonator structure having CMOS compatibility formed in accordance with the invention.

FIG. 8 shows a ring resonator structure 50 having CMOS compatibility formed in accordance with the invention. The ring resonator structure 50 includes an insulating substrate 58 where a core 60 having Si or $Si_3N_4$ core is formed. An insulating layer 56 is formed on those surfaces not facing the insulating substrate 58. Also, the thickness of the insulating layer 56 should preferable be small so as to increase the F-factor. A chalcogenide glass layer 54 is formed on the insulating layer 56 using thermal evaporation or other film deposition techniques, such as sputtering or CVD. The chalcogenide glass layer 54 acts as a cladding layer. The insulating layer 56, in this embodiment, is comprised of $SiO_2$ but other insulating materials can be used. The insulating substrate 58, in this embodiment, is comprised of $SiO_2$ but other insulating substrates can be used. Note the chalcogenide glass layer 54 provides separation between the core 60 and air 52.

The chalcogenide glass material can be deposited and processed by similar techniques and tools as are currently used for CMOS processing.

Figure 9B:
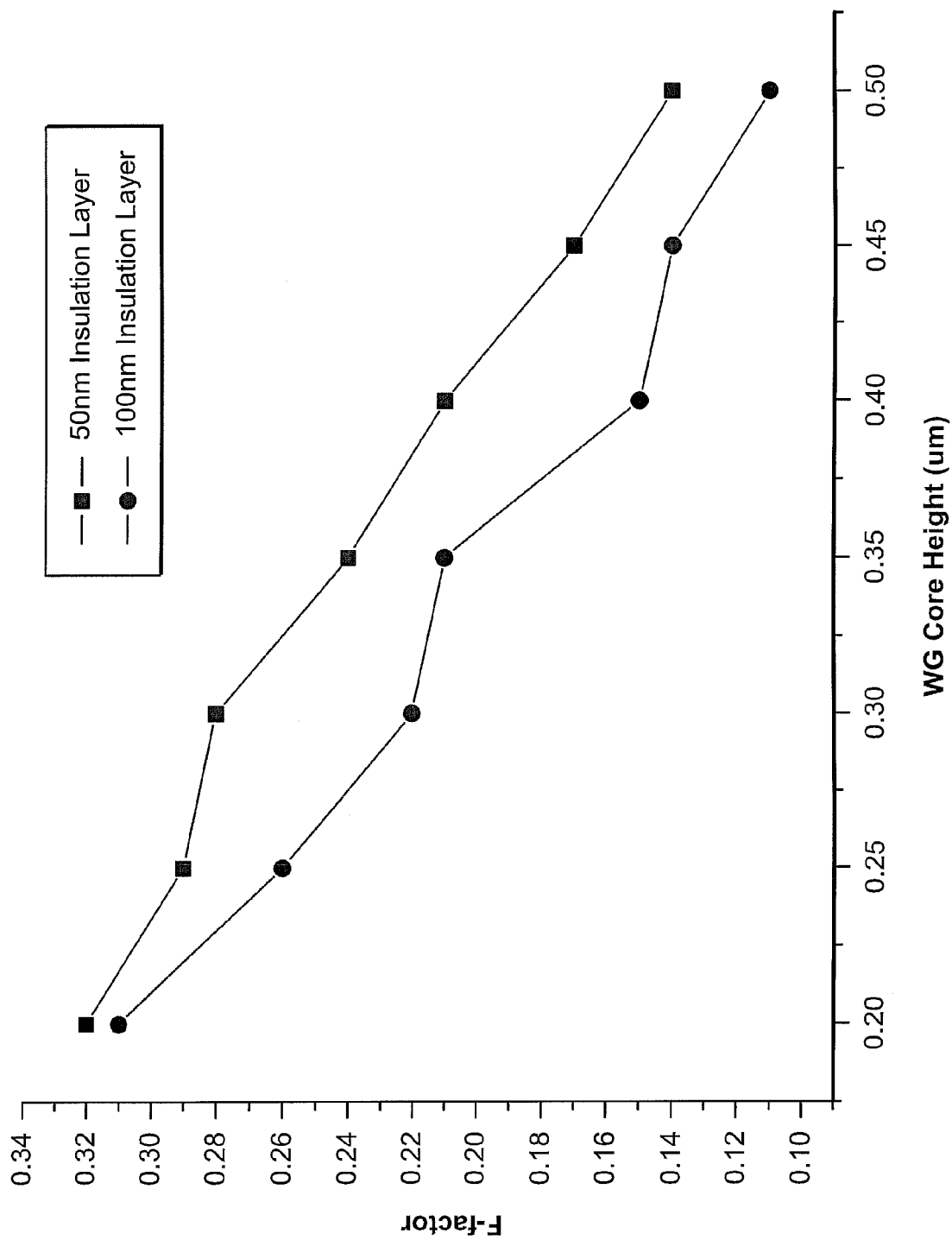
FIG. 9B is a graph that demonstrates how an insulating layer thickness can effect the F-factor associated with the ring resonator structure of FIG. 8.

FIG. 9A shows a graph demonstrating the advantages of using a core having $Si_3N_4$ for the ring resonator structure 50 shown in FIG. 8. It is clearly apparent that a core 60 having $Si_3N_4$ used in ring resonator structure 50 has a higher F-factor then a core 60 having Si. FIG. 9B is a graph that demonstrates how the insulating layer 56 thickness can effect the F-factor associated with the ring resonator structure 50 of FIG. 8.

Although the present invention has been shown and described with respect to several preferred embodiments thereof, various changes, omissions and additions to the form and detail thereof, may be made therein, without departing from the spirit and scope of the invention.

What is claimed is:

1. A ring resonator structure comprising:
a semiconductor substrate;
a core comprising $Si_3N_4$; and
a cladding;
wherein said cladding comprises chalcogenide glass to improve electromagnetic confinement in said ring resonator structure, said chalcogenide glass includes morphologically modified chalcogenide glass annealed above its glass transition temperature in order to remove surface roughness associated with forming said cladding.

2. The ring resonator structure of claim 1, wherein said semiconductor substrate comprises $SiO_2$.

3. The ring resonator structure of claim 1, wherein said semiconductor substrate comprises Si.

4. A method of fabricating a ring resonator structure comprising:
providing a semiconductor substrate;
forming a core;
forming a cladding; wherein either said core or said cladding comprises chalcogenide glass to improve electromagnetic confinement in said ring resonator structure; and
exposing said core or said cladding to a thermal reflow process in which said chalcogenide glass are annealed above its glass transition temperature in order to remove surface roughness associated with forming said core or cladding.

5. The ring resonator structure of claim 4, wherein said semiconductor substrate comprises $SiO_2$.

6. The ring resonator structure of claim 5, wherein said core comprises Si.

7. The ring resonator structure of claim 6, wherein said cladding comprises chalcogenide glass.

8. The ring resonator structure of claim 4, wherein said semiconductor substrate comprises Si.

9. The ring resonator structure of claim 8, wherein said core comprises chalcogenide glass.

10. The ring resonator structure of claim 9, wherein said cladding comprises $SiO_x$, $SiN_x$ or PMMA.

11. The ring resonator structure of claim 4, wherein said core comprises $Si_3N_4$.

12. The ring resonator structure of claim 11, wherein said cladding comprises chalcogenide glass.

* * * * *